Dec. 9, 1941.　　　C. L. EKSERGIAN　　　2,265,938
COOLING ARRANGEMENT FOR BRAKE DRUMS
Filed Nov. 10, 1939　　　3 Sheets-Sheet 1

INVENTOR:
Carolus L. Eksergian
BY John P. Tarbox
ATTORNEY

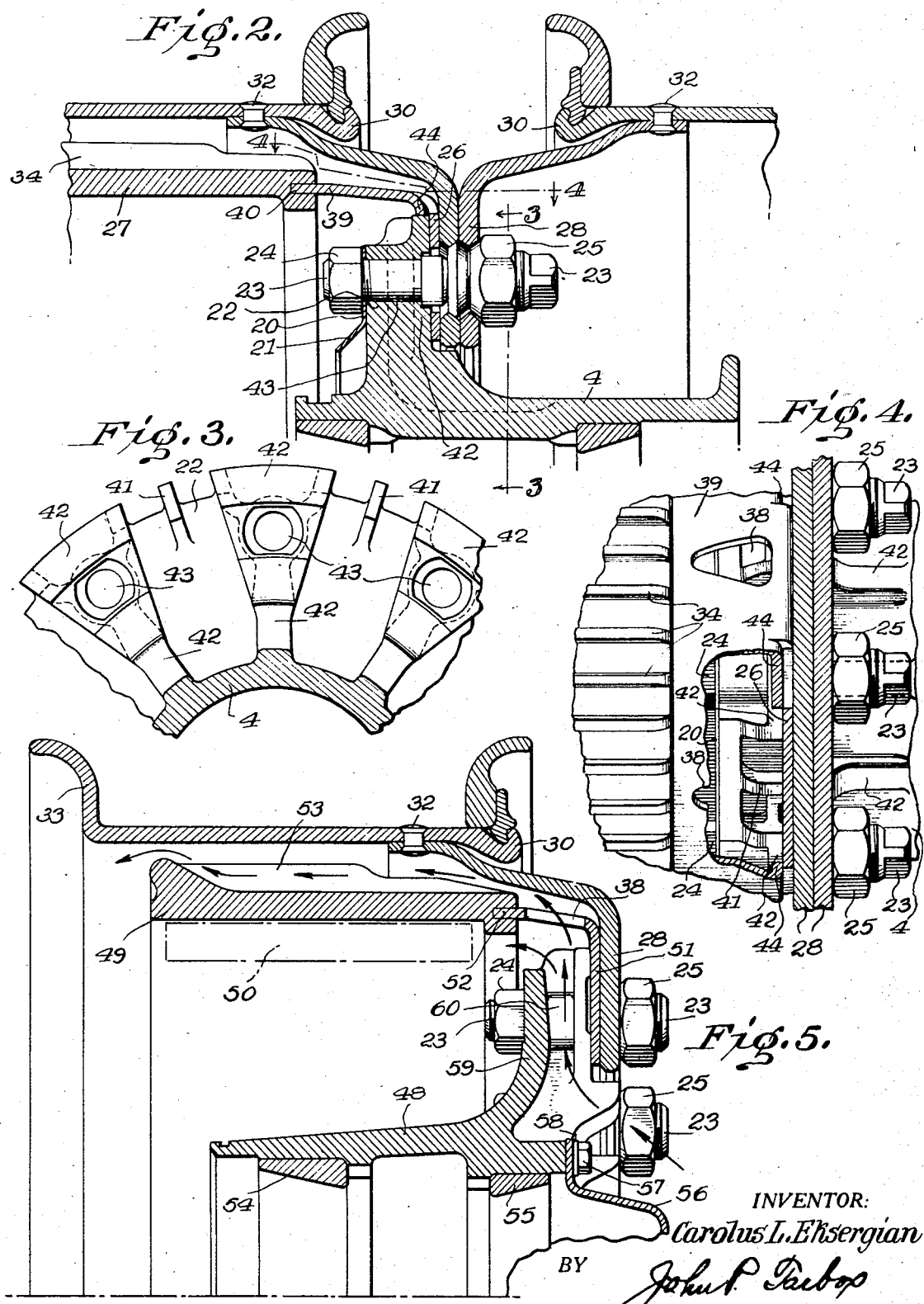

Dec. 9, 1941.  C. L. EKSERGIAN  2,265,938
COOLING ARRANGEMENT FOR BRAKE DRUMS
Filed Nov. 10, 1939  3 Sheets-Sheet 3
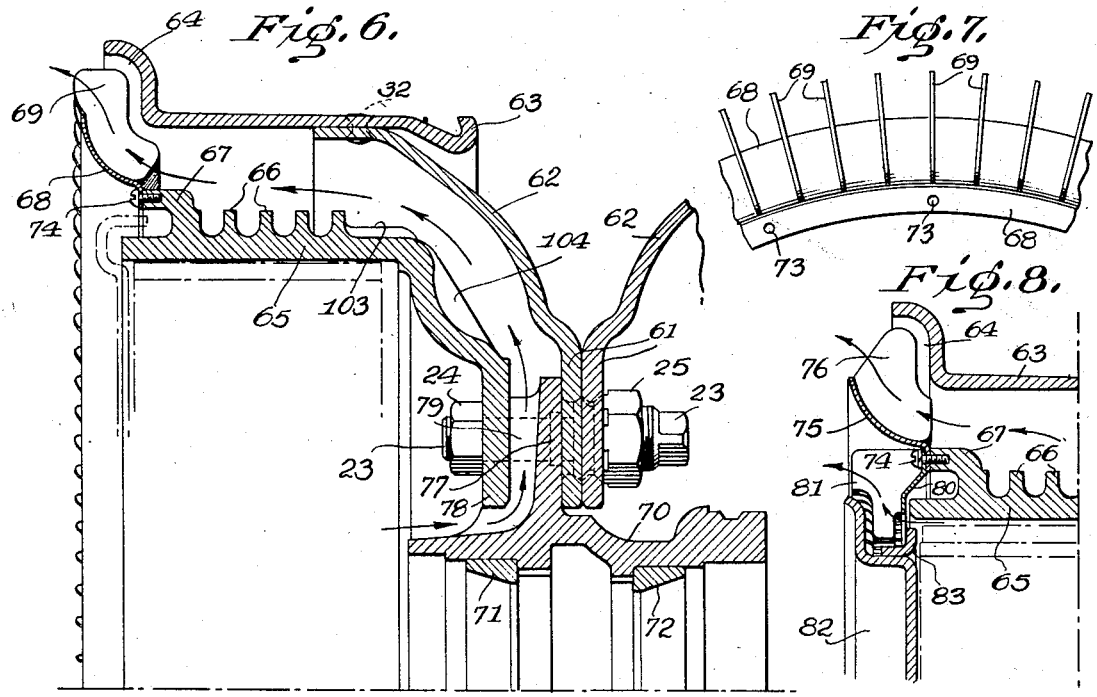
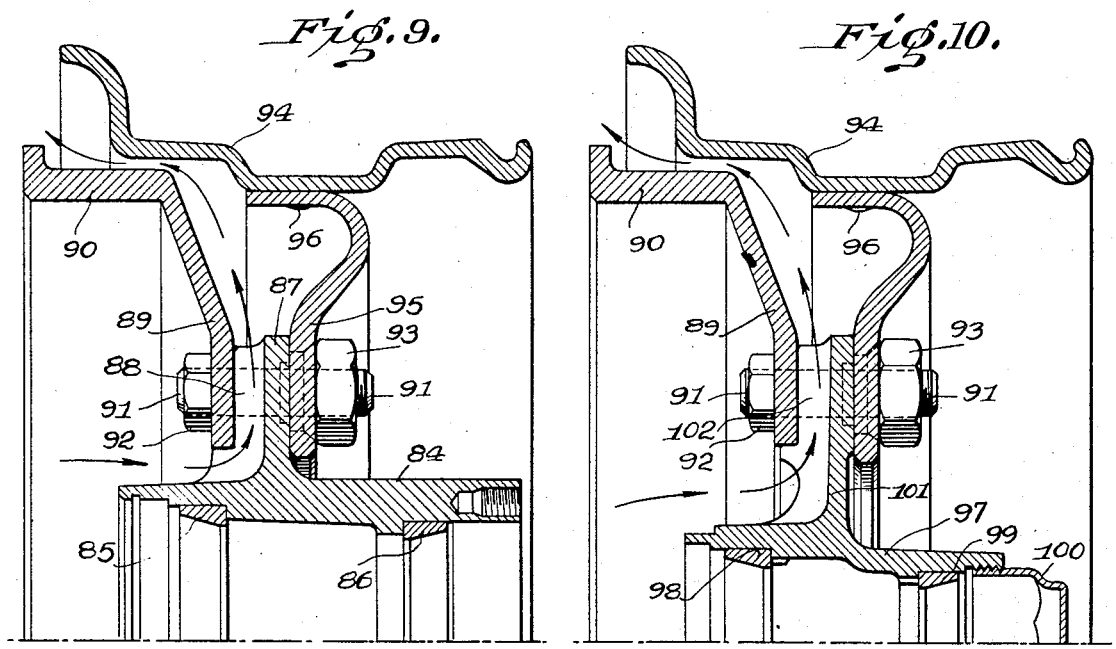
INVENTOR:
Carolus L. Eksergian
BY John P. Barbos
ATTORNEY Patented Dec. 9, 1941

2,265,938

UNITED STATES PATENT OFFICE 2,265,938

COOLING ARRANGEMENT FOR BRAKE DRUMS

Carolus L. Eksergian, Detroit, Mich., assignor to Budd Wheel Company, Philadelphia, Pa., a corporation of Pennsylvania Application November 10, 1939, Serial No. 303,788

8 Claims. (Cl. 188—264)

The present invention relates to means for cooling brake drums, particularly those used with heavy vehicles such as trucks, buses, and large cars.

In such vehicles the brake drum surface available is inadequate to dissipate the kinetic energy of the vehicle, without producing an excessive rise of temperature, which is likely to injure the brake lining.

The present invention therefore contemplates increasing the cooling effect on the brake drums over that present naturally due to stray air currents or conduction of heat to other parts of the vehicle, by intentionally producing a strong current of cooling air impinging on the brake drum whenever the vehicle is in motion, thereby producing a cooling effect not only while the brake is applied but also between braking periods.

The invention contemplates forming preferably radial channels in the outer face of the hub flange, in the spaces between the bolts which secure the brake drum to the wheel hub, so that a centrifugal blower effect will be provided by the rotation of the parts, causing some of the air to travel over the outer face of the brake drum while the remainder passes through said drum, through suitable openings.

Various other features may be used also to increase the cooling effect, such as providing circumferential channels on the outside of the drums to be traversed by the air currents, and providing a separate member carrying radial vanes, to produce the air currents or assist in their production.

The features of the present invention may be summarized as producing a cooling effect in various ways, such as, first, forcing air across the outside of the drum by a mechanism equivalent to a centrifugal blower located somewhere in the hub region.

A second method of cooling would include the above feature with the addition of simultaneously forcing air also over the inner surface of the brake drum.

A third method contemplates drawing the air across the outer surface of the drum by means of a centrifugal blower mechanism located outside the drum and adjacent the tire-holding rim.

A fourth method consists of the above with the added idea of drawing air out of the inside of the drum at the same time.

Finally, a fifth method consists in combining all four of the above ideas, that is, both forcing and drawing air over both the inside and outside of the brake drum.

It will be understood that these inventive ideas may of course be embodied in very many physical embodiments, a few of which are disclosed in the present specification and the more or less diagrammatic drawings accompanying the same and forming a part thereof.

In said drawings:

Fig. 2 is a fragmentary sectional view similar to Fig. 1 differing only in that it is taken at one of the wheel attaching bolts;

Fig. 3 is a fragmentary sectional elevation of the hub mounting flange of Figs. 1 and 2, the section being made on the plane indicated by the line 3—3 of Fig. 2, the wheel flanges and bolts being omitted;

Fig. 4 is a fragmentary view of the exterior of the brake drum and associated elements, partly broken away and partly in section on the plane indicated by the line 4—4 of Fig. 2;

Fig. 5 is a fragmentary longitudinal section through a front wheel hub, rim and brake drum intended for supporting a single tire;

Fig. 6 is a longitudinal section, partly broken away, of a dual-rim wheel with its hub and brake drum;

Fig. 7 is a fragmentary elevation of a fan attachment for the brake drum, having radially directed vanes thereon, as used in Fig. 6;

Fig. 8 is a fragmentary longitudinal section corresponding to Fig. 6 but having slightly modified vanes and providing also means for cooling the interior of the brake drum;

Fig. 9 is a longitudinal section through a further modified form of cooling mechanism applied to a rear wheel of the single rim type; and Fig. 10 is a similar view of the corresponding front wheel.

In all the figures, corresponding parts are indicated by the same reference characters.

Figure 1:
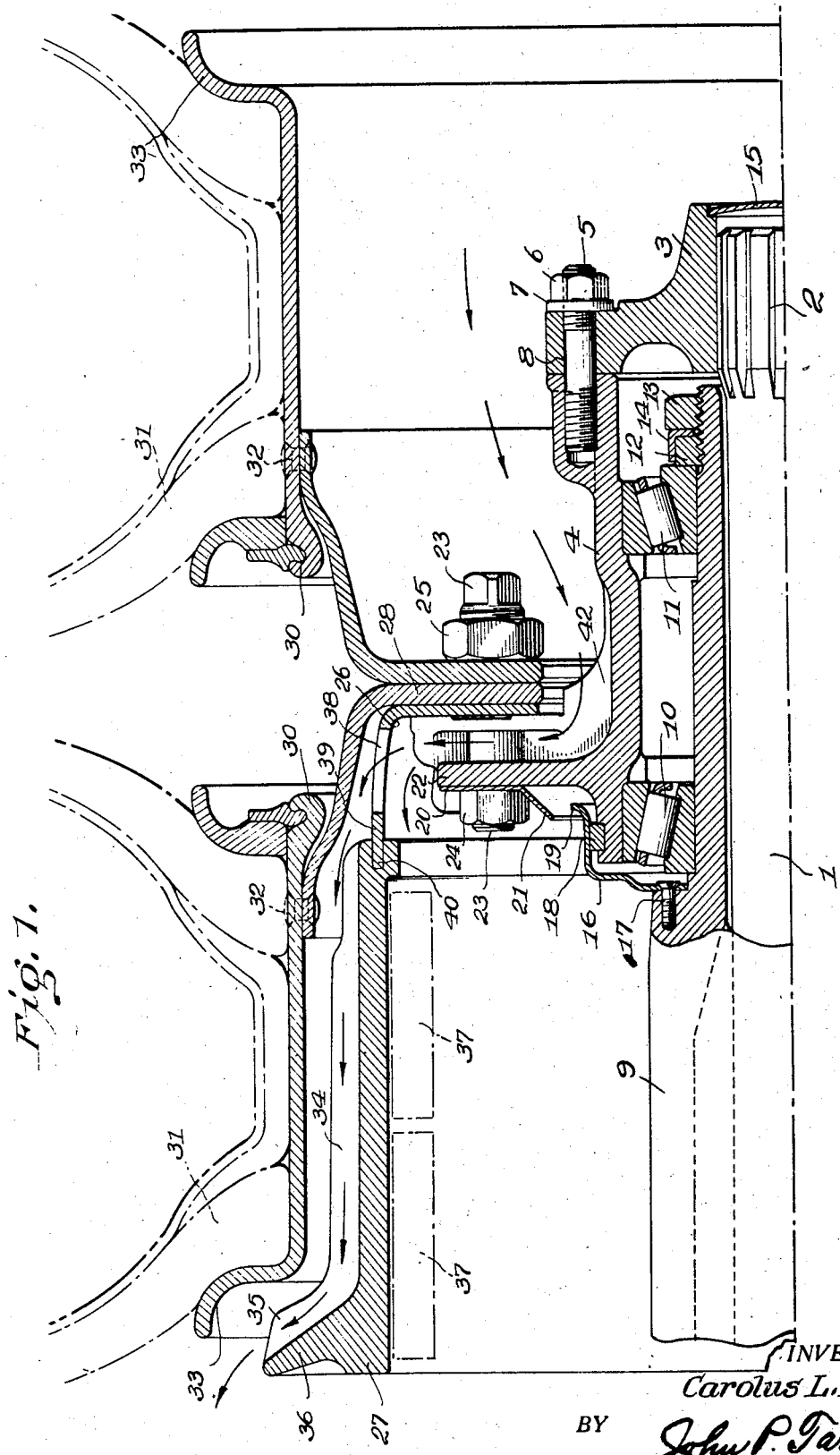
Fig. 1 is a longitudinal section, partly in elevation, showing cooling means incorporated in a rear wheel having dual tire rims thereon, wherein the brake drum is substantially inclosed within one of said rims.

Referring first to Figs. 1 to 4, inclusive, the axle 1 having keyways 2 formed in its end, supports the correspondingly keyed hub cap 3 which is secured to the hub 4 by the studs 5, passing through holes 8 in the hub cap 3, and cooperating with the nuts 6 and lock washers 7.

The hub 4 is mounted on the axle housing 9 by suitable bearings, such as the roller bearings 10 and 11 held in place by the nuts 12 and 13 with lock washer 14 between them. A cover disk 15 may be provided to close the end of the hub cap 3, to prevent entrance of foreign matter. At the other end of the hub a pan 16 may be used for the same purpose, being secured to a shoulder on the axle 9 by screws such as 17 and sealed to the hub 4 by the sealing ring 18. The pan 16 may have an outwardly turned oil-throwing edge 19 to throw any oil leaking past the sealing ring 18, which oil is caught by the out-turned edge 21 of the flanged ring 20 carried by the hub 4, and thus prevented from reaching the brake drum.

This ring 20 is attached to the circumferential bolting-on flange 22 of the said hub by the studs 23 and nuts 24, said studs serving also for cooperating with the nuts 25 to secure the radially extending inner flange portion of the support 26 for the brake drum 27 and the radial securing flanges of wheel bodies 28, which support the tire holding rims 30, which may be secured thereto in any suitable way, for example by means of rivets 32. The tires 31 are indicated in dot-and-dash lines merely to show the relative positions thereof.

It will be observed that the said two rims and their flanged wheel bodies 28 are identical with one another, so that they are interchangeable. The end of the rim 30 remote from the wheel body 28 is curved substantially as shown at 33, and advantage is taken of this configuration to provide outwardly extending radial vanes 34 on the exterior of the brake drum 27, each vane having an outwardly extending flange 36 at the end of the said drum, said radial vanes with their outwardly bent ends thus being accommodated within the inner rim 30 and following its general direction, although spaced apart therefrom. The brake shoes or linings 37 which are accommodated within the brake drum 27 are shown in dot-and-dash lines merely to indicate their relative position.

The flanged support 26 may have a series of apertures 38 in its peripheral flange portion 39, as shown best in Fig. 4. The brake drum 27 may be secured to the flange portion 39 in any suitable way, for example by casting it directly upon said flange as indicated at 40. The radial flange 22 of the hub 4 may also have a series of radially extending vanes such as 41 thereon, said vanes being located near the periphery thereof as shown best in Fig. 3, while between said vanes it is provided with the mounting lugs 42, which serve the double purpose of strengthening the flange 22 and spacing the mounting flanges 26 and 28 therefrom, so as to provide a relatively open air passage. These lugs have the bolt holes 43 therein to receive the studs 23.

As shown in Figure 2 the flanged support 26 of the brake drum has lugs 44 struck therefrom at the bend where the peripheral flange portion 39 is formed thereon. The free unattached end of each lug engages the outer end of a radially extending mounting lug 42 for centering the brake drum 27 on the hub 4 and for holding the same concentric with said hub.

Referring now to the structure illustrated in Fig. 5, there is shown a front wheel hub 46 carrying a single wheel body 28 and rim 30 and a brake drum 49 having a brake shoe 50 therein. The said brake drum may be secured to the hub by means of the flanged support 51 having the peripheral portion 52, secured to the brake drum 49 in any suitable way, as by casting it around said flange and this flange also has the openings 38 therein, to allow cooling air to pass therethrough.

The outside of the brake drum has a series of radial cooling vanes 53 thereon. The hub 48 contains the customary bearings, only the outer races 54 and 55 of which are indicated, and a suitable cap or closure member 56 may be attached to the end of the hub in any desired way, for example by the cap screws 57, with lock washers 58 under their heads.

The hub 48 has a circumferential flange 59 for securing the brake drum and tire rim to the hub, and the construction of this flange is in general like that shown in Figs. 3 and 4, that is, air passages are provided as shown at 60, said passages being arranged in the spaces between the lugs, as before.

Referring now to Fig. 6, there is shown a somewhat different form of device, wherein the vanes or fins on the exterior of the brake drum run circumferentially instead of radially. In this figure there is shown a wheel hub 70, having the bearing races 71 and 72 therein, and a flange 77 extending circumferentially outward therefrom. To this flange 77 is secured the flange 78, forming a part of the brake drum 65, as well as the flanges 61 of the wheel bodies supporting the rims 63. There is a curved wheel body portion 62 between each flange 61 and its rim 63, and the rim is secured at or near the end of this portion 62 by any suitable means, such as the rivets 32. As before, the studs 23 and nuts 24 and 25 serve to secure all the parts together as shown.

Air passages 79 are provided as in the other forms, by appropriate shaping of the circumferential flange 77. These passages, continuing between the brake drum 65 on the one hand and the curved wheel body portion 62 of each rim support, together with its rim 63, on the other hand, finally terminate in the curved edge portion 64 of the rim 63. Instead of the radial vanes on the brake drums of the preceding forms, circumferential ribs or vanes 66 are here provided, and the brake drum terminates in a raised flange 67, to which a set of vanes 69, mounted on a curved ring 68, is secured in any suitable manner, for example by means of the screws 74, passing through holes 73 in the ring, as shown in Fig. 7. An air passage leading between the exterior of the brake drum and the interior of the rim and its supporting flange is thus provided.

The form shown in Fig. 8 is substantially the same as that of Fig. 6, with the exception that the ring 75, bearing the vanes 76, is shaped somewhat differently, as shown, and in addition thereto a further ring 80, carrying vanes 81 extending below the vanes of the ring 75, is also provided. The function of last-named set of vanes is to produce a current of cooling air, traversing the inside of the brake drum 6b, and in order to accomplish this it is preferred to provide a relatively stationary pan-shaped closure member 82, having the deflector ring 83 thereon, to substantially close the inner end of the brake drum so that any air current produced by the vanes 81 will be drawn through the inside of the drum.

Finally, Figs. 9 and 10 disclose the rear and front hubs of a still further modified form. The rear hub 84 has the races 85 and 86 therein, and has a circumferential flange or spider 87 extending outward therefrom, to define air passages 88 between it and the securing flange 89 of the brake drum 90. The rim 94 has a flanged wheel body 95, attached thereto in any desired way, as by spot welds or rivets 96, and this wheel body 95 has its radially inner flange held to the spider 87 by the studs 91 cooperating with nuts 92 and 93.

The front wheel hub 97, of Fig. 10, has the races 98 and 99 therein, and may be sealed by the screw cap 100 in the customary way. It will be seen that the circumferential flange 101 is somewhat deeper than that of Fig. 9, so that the diameter of the circle of studs 91 will be the same in the two figures, to make it possible to use a single standard size of brake drum and tire rim on front and rear wheels. The air passages 102 corresponding to the air passages 88 are therefore slightly longer than the latter, but otherwise are not materially different.

In operation, referring first to Figs. 1 to 4, inclusive, it will be seen that when the hub and its connected parts are in rotation, when the vehicle is in motion, a current of air will be drawn into the hub in the direction shown by the series of arrows, this air-stream passing between the brake supporting flange 26 and the hub flange 22, and then dividing into two currents, one of which washes over the vanes 34 while the other flows through the inside of the drum 27.

This air stream is produced by several cooperating elements, namely the vanes 42 formed on the hub flange 22, and the vanes 34, 35 formed on the outer surface of the brake drum. The vanes 42 act to force or push a current of air in the direction of the arrows, while the vanes 34 and their extensions 35 at the same time produce a centrifugal suction effect, which will aid the first-named vanes 42.

It should be particularly observed that the vanes 34 have the double function of producing an air current and of simultaneously acting as heat radiating or cooling means for the brake drum. By proper proportioning of the sizes of apertures 38, it becomes possible to control to a certain extent the relative amounts of air flowing in the two paths, so that the desired amount of cooling air may flow through the inside of the brake drum.

The same operation occurs also in the form shown in Fig. 5, in which air is both forced and drawn, over both the inside and outside of the brake drum, and in this form the cooling air flows along the vanes on the brake drum.

However, in the forms shown in Figs. 6 and 8, the air flows across the cooling fins on the outside of the brake drum, which in these forms of device do not themselves act as impellers. In Fig. 6, there is a combined force and suction effect. The air current is here initially produced by the arms of the spider acting as centrifugal impeller vanes, and the effect thereof is augmented and assisted by the further set of vanes 69, which act as a centrifugal suction pump. The current of air thus produced by the combined suction and pressure effects flows across the fins 66 on the outside of the drum 65, to dissipate the heat, and the cooling effect may be still further improved, if desired, by means of the radial fins or vanes 103 and 104 which may be formed on the outer surface of the brake drum, and its supporting flange, as shown in Fig. 6. These vanes, incidentally, may also have a slight assisting effect in producing the air current, which will flow approximately in the path shown by the series of arrows.

While in Fig. 6 the flow of air follows a path solely washing around the outside of the brake drum, in the Fig. 8 form the two sets of vanes 76 and 81 will produce two separate currents, by suction, said currents following the paths shown by the arrows, and being respectively outside and inside the brake drum 65.

Finally, in the forms shown in Figs. 9 and 10, which are identical in operation, the current of cooling air is produced by the arms or vanes of the hub spider, acting as a centrifugal blower, to force the air current over the upper surface of the brake drum. In all the forms, it will be understood that a certain amount of air flow would take place even without the provision of vanes, because of the natural friction of the air against the rotating surfaces, but the cooling effect is enormously increased by the provision of such specific impellers.

While in the present specification and drawings several specific embodiments and modifications of the invention have been disclosed, it should be clearly understood that the particular forms shown are merely illustrative of the inventive concepts, and in no way constitute a complete or exhaustive exposition thereof. Obviously, the invention is capable of embodiment in very many other forms, and moreover the present disclosure is largely diagrammatic in nature. Therefore, for a full understanding of the scope of the present invention, reference should be had solely to the following claims.

I claim:

1. In combination, a hub having a body portion and a radial bolting-on flange projecting therefrom having axially spaced inner and outer seating faces, one of said axial seating faces of said flange being formed with circumferentially spaced radial ribs terminating substantially at the outer periphery of the flange, a brake drum having a support including a radial securing flange extending inwardly close to, but slightly spaced from, the hub body and overlapping and secured to said face of the hub flange, said ribbed hub flange and the inner overlapping portion of the brake drum flange providing radial passageways of substantially the radial depth of said flange open at their radially inner and outer ends, said radial passageways acting in the rotation of the hub and drum, as a centrifugal blower, a demountable wheel body and rim assembly also having a flange portion extended close to, but slightly spaced from, the hub body and secured to said hub flange in substantially parallel relation to the brake drum flange, said wheel body and rim assembly outwardly of the hub flange being so disposed with respect to said drum and its securing flange as to provide an axially extending fully open-ended annular passageway between the rim and brake drum, said passageway communicating freely with the radially outer ends of said radial passageways and through which the air from said outer ends is led over the brake drum to cool the same.

2. The combination according to claim 1 in which the axial end of the drum remote from its securement to the hub has a generally radially outwardly directed extension and the adjacent axial end of the rim has a generally radially outwardly directed tire-retaining flange spaced from the extension of the drum, and circumferentially spaced generally radially extending cooling vanes projecting into the space between said drum extension and said rim flange, said vanes acting in conjunction with said radial passageways as a second centrifugal blower to force air over the drum to cool the same.

3. The combination according to claim 1 in which the periphery of the drum remote from its securement to the hub is provided with generally radially arranged axially-extending vanes projecting into said open-ended annular passageway and acting as a second blower boosting the blower effect to the said radial passageways to force air over the drum to cool the same.

4. The combination according to claim 1 in which the peripheries of the drum and rim remote from their attachment to the hub each have generally radial extensions in opposed spaced relation to each other, one of said drum and rim being provided in its radial extension with circumferentially spaced vanes extending substantially across the space between the opposed radial extensions, these vanes providing radial passageways supplementing the blower effect of the radial passageways at the hub to force air over the brake drum to cool the same.

5. The combination according to claim 1 in which the radial ribs are provided on the axially outer face of the hub flange whereby the radial passageways open at their radially inner ends to the axially outer side of the wheel, openings being provided in the brake drum support generally radially outwardly of its securing flange and the radial passageways whereby air forced through the radial passageways is caused to flow both past the radially outer and the radially inner faces of the drum to cool the same.

6. The combination according to claim 1 in which the ribs are formed in, and the brake drum flange secured to, the axially inner face of the hub flange, and the wheel body and rim assembly are secured to the axially outer face of the hub flange.

7. In combination, a hub, a brake drum and a wheel body and rim assembly secured to the hub, said rim extending over said brake drum in spaced relation thereto providing an annular axially extending fully open-ended passage therebetween, means for admitting air to the axial end of said passage adjacent the securement of the parts to the hub, the peripheries of said drum and rim remote from their securement to the hub each having generally radial extensions in opposed spaced relation forming a generally radially extending annular passage therebetween, circumferentially spaced radial vanes secured to one of said radial extensions and extending toward the opposed extension, whereby to provide a centrifugal blower action to draw air over the brake drum to cool the same.

8. The combination according to claim 7 in which an additional set of radial vanes is associated with the said remote end of the drum radially inward of the first-named vanes, the additional set being arranged to draw cooling air across the radially inner face of the drum.

CAROLUS L. EKSERGIAN.